T. I. WESTON.
SEPTIC TANK.
APPLICATION FILED APR. 2, 1915.
1,177,075.
Patented Mar. 28, 1916.
2 SHEETS—SHEET 1.
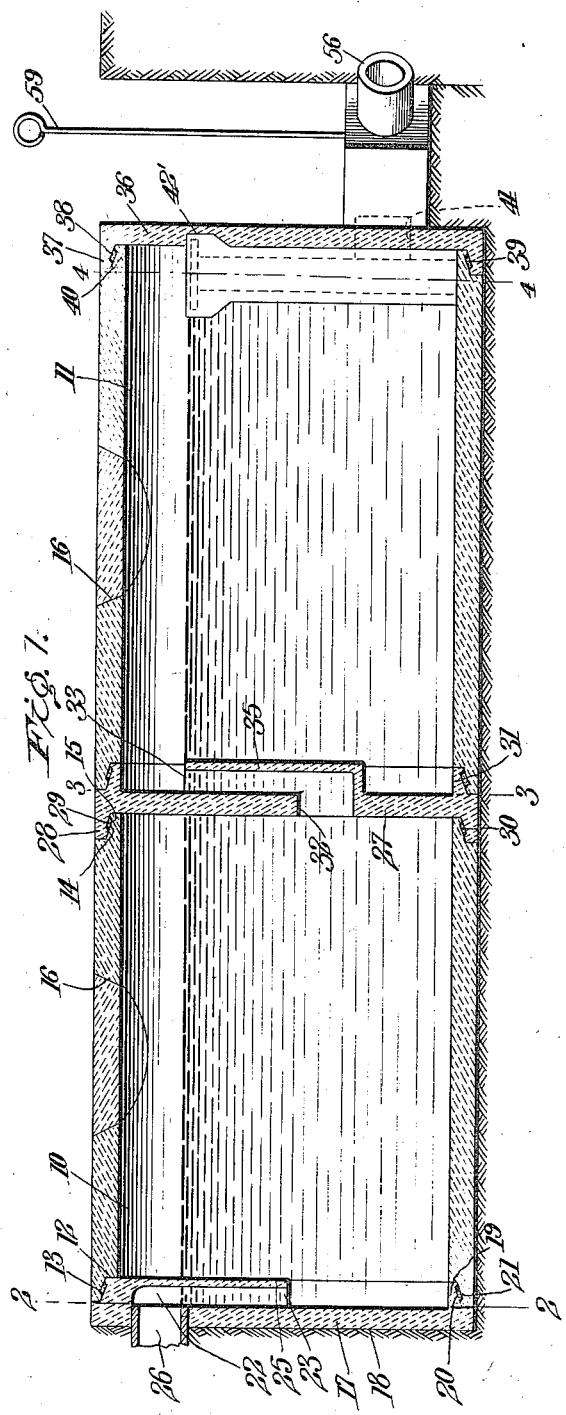
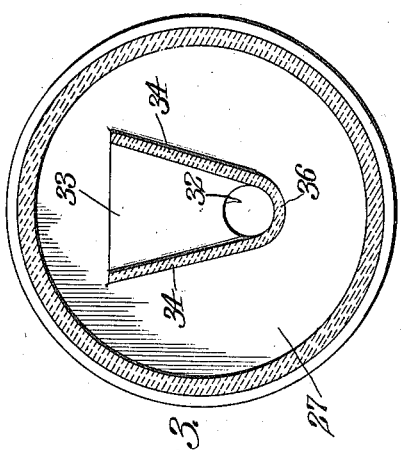
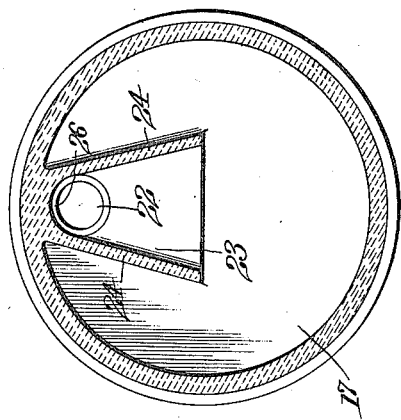
Inventor
Thomas I. Weston
by Foster Freeman Watson & Coit
Attorneys

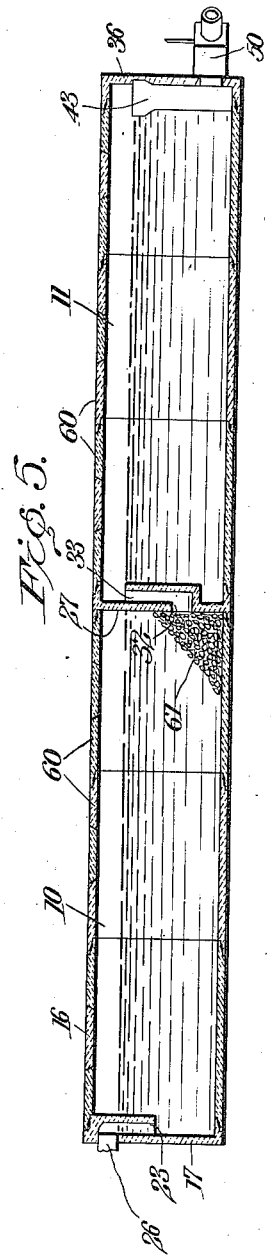
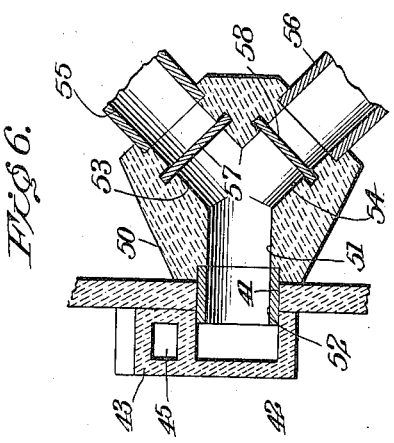
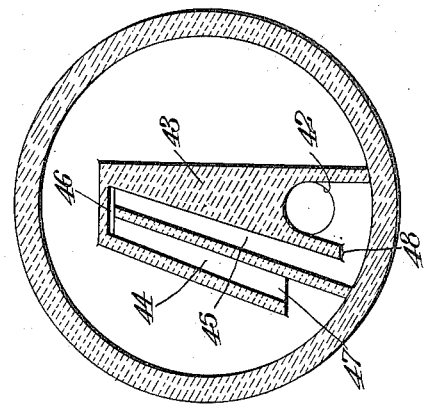

UNITED STATES PATENT OFFICE.

THOMAS I. WESTON, OF COLUMBIA, SOUTH CAROLINA.

SEPTIC TANK.

1,177,075.　　　　　Specification of Letters Patent.　　Patented Mar. 28, 1916.

Application filed April 2, 1915. Serial No. 18,750.

*To all whom it may concern:*

Be it known that I, THOMAS I. WESTON, a citizen of the United States, and resident of Columbia, Richland county, South Carolina, have invented certain new and useful Improvements in Septic Tanks, of which the following is a specification.

My invention relates to septic tanks for sewage disposal systems and particularly to that class of tanks in which the action of bacteria is taken advantage of in converting the objectionable organic matters of sewage and polluted waters into an inert inorganic form.

The principal objects of my invention are to provide an improved tank construction which may be manufactured at a central plant or factory and which may be readily installed by the purchaser without the use of special apparatus.

Another object is to provide a round tank so designed that the sewage is thoroughly but gently mixed as it passes through each part of the tank.

A further object is to provide a means for periodically diverting the sewage from one seepage bed to another.

The above and other objects and the novel features of the invention will be apparent from the following description taken in connection with the drawings in which the preferred form of my invention is illustrated.

Figure 1 is a longitudinal sectional view, partly in elevation, illustrating a septic tank embodying my invention; Figs. 2, 3 and 4 are transverse sectional views taken, respectively, on the lines 2—2, 3—3 and 4—4 of Fig. 1; Fig. 5 is a longitudinal sectional view of another septic tank embodying my invention, and Fig. 6 is a horizontal sectional view of a valve for diverting the sewage from one seepage bed to another.

Referring to the drawings the septic tank constructed according to my invention comprises a receiving chamber 10 and a discharge chamber 11 each of which is constructed of one or more cylindrical pipe sections substantially of the construction of the pipe section shown and described in my Patent No. 1,132,137, granted March 16, 1915.

One end of each pipe section has a tapering socket 12 with an off-set recess 13, and the opposite end of the pipe section is provided with a tapering spigot 14 having an off-set recess 15 and constructed to fit a suitable socket member corresponding to the socket member 12.

Each of the cylindrical pipe sections is made of concrete or other plastic material and is provided with a man-hole opening 16 the cover of which fits flush with the outer cylindrical surface of the pipe section.

For convenience the compartment 10 which receives the inflowing sewage will be designated as the sludge chamber and the compartment 11 from which the sewage is periodically discharged to the filter beds by a siphon will be designated the siphon chamber.

The inlet end of the sludge chamber 10 comprises an end wall 17 which has a flat exterior surface 18 and a peripheral rim portion 19 tapered on its exterior surface and provided with an off-set circumferential recess 20. The tapering portion 19 of the end wall 17 is designed to fit in the socket 12 and the recess 20 thereof registers with the recess 13 in the socket thereby forming a channel to receive plastic material which forms the key 21 to unite the end wall 17 to the cylindrical pipe section. The form of joint is fully described in my Patent No. 1,132,137 above referred to.

The end wall 17 is cast or molded of concrete or similar plastic material and is provided with an inlet passageway 22 which extends through the wall and opens on the interior of the wall into a passageway 23. The passageway 23 is formed on the interior of the wall 17 by integral side walls 24 and the top wall 25, which form the passageway 23 with the inside surface of the wall 17. The lateral walls 24, 24 of the passageway 23 form a socket at their ends for a sewer pipe 26, and diverge downwardly from the opening 22 thereby forming a flaring passageway so that the velocity of the inflowing sewage will be considerably diminished to prevent any agitation of the contents of the sludge chamber 10. The sewage is led to the inlet opening 22 by a suitable tile pipe 26. The flaring passageway 23 extends downwardly diametrically across the end wall 17 from the inlet 22 which is located near the top of the wall 17, the lower end of the passageway 23 terminating considerably beneath the normal water level in the sludge chamber 10, thereby serving also as a trap to prevent the escape of foul gases from the chamber 10.

The two cylindrical members which constitute the chambers 10 and 11 are separated by a partition wall 27 one side of which has a peripheral rim portion 28 provided with a tapering socket portion having an off-set circumferential recess 29. The tapering spigot end 14 fits into the socket portion of the wall 27 and is united to said wall by a key 30 similar to the key 21. On its opposite face the partition 27 has a tapering peripheral spigot portion 31 joined in the same manner to the cylindrical member which constitutes the chamber 11. The wall 27 is cast or molded from concrete or similar plastic material and has a passageway 32 in one side thereof opening in one side thereof and extending therethrough to the opposite side where it terminates in a flaring passageway 33 extending upwardly diametrically across the surface of the partition. The passageway 33 has the two lateral walls 34 which with the outer wall 35 and the surface of the partition 27 form the flaring passageway, the walls 34, 34 diverging upwardly from the passageway 32 and being joined at their lower ends by the curved part 36. The partition 27 when secured in place between the two cylindrical members forms therewith a continuous unbroken cylindrical exterior surface for the tank. The inlet to the passageway through the partition 27 is located considerably below the normal water level in the sludge chamber 10 and the outlet of the flaring passageway 33 on the opposite side of the partition 27 is located substantially at the normal surface of the water in the chamber 10, being constructed so that the outlet thereof will be disposed at substantially the same height as the inlet 22.

The outlet end of the siphon chamber 11 has an end wall 36 which is provided with a tapering peripheral socket member 37 at its rim. The socket member 37 is provided with a circumferential interior offset recess 38 to receive a portion of a locking key 39 which unites the end wall 36 to the tapering spigot portion 40 as in the joint previously described. The lower end of the end wall 36 has a passageway 41 extending therethrough which passageway registers with the outlet opening 42 of the siphon block 43 abutting against the inner face of the end wall 36. The siphon block is preferably cast separate from the end wall 36 and has a lug 42' fitting a recess in the inner surface of said wall to hold it in position.

The block 43 is molded of concrete and comprises a siphon passageway having the two legs 44 and 45 connected at their upper ends by a cross passage 46 which is comparatively thin vertically, but wide horizontally so that liquid entering through the inlet 47 of the passageway 44 can spread out in the passageway 46 and so that the siphon formed by the legs 44 and 45 will operate quickly and positively when the water reaches a level corresponding to the upper ends of the passages 44 and 45. The lower end 48 of the inner side of the passageway 45 extends below the outlet of the opening 42 so as to form a water seal at that point. The block 43 and the plane of the passageways 44 and 45 extends transversely of the center line of the sections forming the tank, the inlet 47 to the siphon block being located to one side of and out of line with the opening 42 in the block.

Under certain conditions it is desirable and even essential that more than one seepage bed be provided to receive the sewage discharged from the septic tank. This is because the absorption ability of the soil should not be overtaxed as the bacteriological action takes place better where the soil becomes comparatively dry after each dose of the effluent. One of the seepage beds is designed to handle the sewage for a period of time, say thirty days, and then to be relieved by diverting the sewage to the other seepage bed. In order to direct the sewage at will a valve block 50 is mounted at the discharge opening of the end wall 36 and has its inlet 51 connected by a tile pipe 52 to the opening 42 in the siphon block 43, the tile 52 extending through the opening 41 in the end wall 36. The valve block 50 has two discharge passageways 53 and 54 which are connected to the tiles 55 and 56 respectively leading to the separate seepage beds, the admission of the sewage to the pipes 55 and 56 being controlled by the valves 57 and 58 respectively which are operable from the surface by means of rods 59 or other suitable devices. It will be understood that one of the valves is always open and whenever it is desired to change from the seepage bed in use to another the other valve is opened and the valve in use is closed whereby the sewage is diverted to another seepage bed. The region around the outlet ends of the pipes 55 and 56 is usually of some loose material such as broken stone, gravel, or other porous material so that the seepage may readily be distributed throughout a greater area to insure the proper seepage of the sewage into the soil.

In Fig. 5 I have illustrated a tank embodying my invention in which both the sludge chamber and the siphon chamber are made up of a plurality of pipe sections 60 similar to the pipe sections disclosed in Fig. 1. In order to form a screen over the inlet 32 in the partition between the sludge chamber and the siphon chamber a pile 61 of broken stone or similar loose material is introduced into the sludge chamber and piled in front of the opening 32. The screen 61 may be formed of any other suitable screening material to prevent the passage of larger masses through the connection between the two chambers. In order to obtain the best results the septic tank should be disposed under ground where it is dark and warm and where there is practically no air. It is essential that the sewage in the sludge chamber 10 should remain at a constant level and should be disturbed as little as possible by the inflow of the new sewage. The siphon chamber 11 should likewise receive the sewage as gently as possible and it should be of such a size that it will flush automatically once every five to twenty-four hours, which will give the required time for the proper action of the bacteria.

The septic tank is composed of parts of circular shape which may be rolled directly into position without uprighting. All of the parts being circular in form there will be fewer corners in the tanks which eliminates to a great extent any possibility of accumulation and insures thorough mixing and circulation of the sewage. The greatest possible surface area is also presented in the tanks which is very necessary especially in the sludge chamber so that the sludge forming on the surface will be as great in area as possible in proportion to the volume of sewage.

The use and automatic operation of the septic tank will be apparent from the foregoing description.

While the device has been described in detail it will be understood that minor changes may be made therein without departing from the spirit of the invention.

Having thus described my invention what I claim is:—

1. In a septic tank the combination of two tubular members disposed end to end, and a device joining said members together, said device having a rim portion united to each of said tubular members and a partition wall within said rim portion, said partition wall having a passageway therethrough, the inlet of said passageway being located below the normal water level in a portion of said tank.

2. In a septic tank the combination of a tubular member, and an end wall formed as separate parts and of substantially the same diameter, said end wall having a peripheral portion joined to the end of the tubular member, and having a passageway disposed within said peripheral portion and terminating on one side of said wall in a flaring outlet.

3. A septic tank having a wall provided with a fluid passageway, said fluid passageway terminating on one side of said wall in a flaring outlet, the lateral walls of said outlet diverging from the outlet side of said passageway.

4. In a septic tank the combination of a tubular member having end walls joined thereto, one of said end walls having an inlet opening terminating on the inner side of said tubular member in a flaring outlet, the other of said end walls having a passageway terminating on the outer side of said wall in a flaring outlet.

5. In a septic tank the combination of a tubular member having end walls joined thereto, one of said end walls having an inlet passageway at the top thereof and terminating in an outlet on the inner side of said wall which outlet is located below the normal water level in said tank, the other end wall of said tubular member having a passageway therethrough, the inlet of which is disposed below the normal water level in said tubular member.

6. In a septic tank the combination of a plurality of members forming chambers, an inlet for one of said chambers terminating in an outlet on the inner side of said chamber and below the normal water level therein, a partition between said chambers having a passageway therein establishing communication between said chambers and having its inlet located below the normal water level of one of the chambers and its outlet on the other side of the partition and located at the normal water level of the tank.

7. In a septic tank the combination of a sludge chamber having an inlet and an outlet both of which are located below the normal water level in said chamber, a siphon chamber, having an inlet at the normal water level of the sludge chamber and connected to the outlet of the sludge chamber, said siphon chamber having an outlet, and a siphon in said siphon chamber having its outlet connected to the outlet of the siphon member.

8. In a septic tank the combination of tubular members arranged end to end, one of said members constituting part of a siphon chamber, an end wall for the sludge chamber having an inlet opening therein terminating in an outlet within the chamber and below the normal water level, said chamber also having an outlet disposed below the normal water level and connected to the siphon chamber, the outlet of said connection being disposed in said siphon chamber and at the normal water level of the septic tank, said siphon chamber having an outlet therein, and a siphon block in said siphon chamber having an outlet communicating with the outlet of said siphon chamber and a siphon passageway therein in which the fluid flows transversely of the siphon chamber.

9. In a septic tank the combination of a plurality of tubular concrete pipes arranged end to end, a device having a peripheral portion of the same diameter as the pipes and joined to each of said pipes, said device having a wall within its peripheral portion forming a partition between said pipes and separating said tank into a sludge chamber and a siphon chamber, said partition having a passageway therethrough and provided with an inlet disposed below the normal water level in the sludge chamber and terminating in the siphon chamber in a flaring conduit the outlet of which is disposed at the normal water level of the tank, said sludge chamber having an inlet which terminates on the inner side of said chamber in a flaring conduit having its outlet below the normal water level in the sludge chamber, the siphon chamber having an end wall united to the pipe section and provided with an outlet located below the normal water level in said chamber, and a siphon block abutting against the end wall of said siphon chamber and having an outlet therein connected with the outlet in said end wall.

10. In a septic tank the combination of a sludge chamber and a siphon chamber having a partition wall therebetween the sludge chamber having an inlet terminating below the normal water level therein and an outlet disposed below the normal water level, said outlet being connected with the siphon chamber and discharging into the latter at the normal water lever of the tank, said outlet having a screening material disposed in front of the same and located in the sludge chamber, said siphon chamber having an outlet, and a siphon within said siphon chamber having an outlet connected with said outlet of the siphon chamber.

In testimony whereof I affix my signature in presence of two witnesses.

THOMAS I. WESTON.

Witnesses:
J. P. MATHENY,
F. A. BULL.